Patented Jan. 21, 1941

2,229,356

UNITED STATES PATENT OFFICE 2,229,356

COATED AND WATERPROOFED PRODUCT

Peter J. Wiezevich, Elizabeth, N. J.; now by judicial change of name Peter J. Gaylor, assignor to Standard Oil Development Company, a corporation of Delaware No Drawing. Application March 27, 1934, Serial No. 717,576

5 Claims. (Cl. 91—68)

This invention relates to improved wax compositions and methods of preparing same.

According to the present invention various types of waxes are compounded with high molecular weight hydrocarbon polymers in order to produce substantially colorless or relatively light-colored wax compositions having improved properties of plasticity, flexibility, adhesion, toughness and durability, as well as other advantages which will become apparent to those skilled in the art on reading the following specification.

The novel type of compounding agent to be admixed with the waxes preferably comprises substantially saturated hydrocarbon compounds having a molecular weight between the approximate limits of 1,000 to 20,000 or 30,000 (being substantially greater than the molecular weight of paraffin wax which is usually between about 250 and 400). These polymers which have properties varying from an adhesive or tacky nature to a tough hard appearance are generally more or less plastic depending upon their molecular weight, preferably having a chemical structure which may be represented by a long chain of carbon atoms with alkyl groups such as methyl, ethyl, etc. attached as side chains to at least certain of the carbon atoms of the chain such as every second or third carbon atom. Such compounds may advantageously be prepared by polymerizing substituted unsymmetrical alpha-olefines, especially iso-olefines such as isobutylene, isoamylene, etc. at low temperature in the presence of a volatilizable inorganic halide catalyst. The temperature is desirably at or below room temperature such as 5° C., or —10° C., or —20° C., or even lower depending upon the particular catalyst and other reaction conditions used.

As catalyst, boron fluoride has been found particularly satisfactory. Also, boron fluoride mixed with hydrogen fluoride may be used, as well as phosphorus or antimony trifluoride or pentafluoride and aluminum chloride, the latter preferably being in the nascent state as obtained when aluminum is acted on by hydrogen chloride. In the case of aluminum chloride, 3 to 5% of the catalyst may be used, whereas in the case of the previously mentioned catalyst, 1% or so may be sufficient. Also, solutions or double compounds of said halides such as with phenol, cresol, and the like, may be used.

If it is desired to carry the polymerization to the higher ranges of molecular weight where the polymer becomes extremely viscous or even a more or less plastic solid, suitable diluents may be used, preferably a volatile material such as pentane or a commercial naphtha which can be readily driven off if desired after completion of the polymerization. Inasmuch as such polymerizations are usually exothermic, it is generally desirable to provide some means of cooling the reaction chamber either externally or internally as by the use of cooling coils or by the evaporation of a liquefied gas such as propene, etc. The molecular weight may be readily controlled by the temperature and duration of the polymerization, and generally the higher the molecular weight the less sticky and tougher and harder the polymer.

As a particular example of a preferred method of preparing such a polymer, isobutylene is polymerized at a temperature of about —10° C. by bubbling boron fluoride gas through a solution of isobutylene dissolved in liquefied propane. When the molecular weight reaches about 10,000 or 15,000 the reaction is stopped and any catalyst remaining dissolved or suspended in the liquid is removed by washing with water or dilute caustic soda, after which the volatile solvent is removed by distillation, leaving a colorless plastic polymer as residue. This polymer is somewhat tacky and plastic, is soluble in hydrocarbon solvents and mineral oils, is insoluble in water, is quite resistant to oxidation and does not harden substantially with age as do many other adhesive materials which have been used in the past and which have, in general, a fairly high content of unsaturated linkages. One sample of this polymer had an iodine number of 7. Generally these materials have an iodine number below about 15, often as low as 3 or 5 or lower.

Such polymers, prepared according to the above described method, have a high viscosity index, i. e. they show a relatively slight change in viscosity with changes in temperature. This property is highly desirable when the wax composition in which the polymer is compounded is to be used under conditions of varying temperature. In other words, the polymer helps to maintain uniform consistency or uniform degree of hardness or softness throughout various changes in temperature.

Inasmuch as the product obtained by the above described method is considered to be a long chain type polymer with side groups attached (two methyl groups on every second carbon atom in the case of isobutylene polymers), it may also be possible to arrive at a compound having a similar structure by hydrogenation of unsaturated natural products of suitably high molecular weight such as rubber, and therefore such procedures and resultant products are deemed to be within the scope of this invention. During the course of polymerization, the degree of unsaturation is gradually reduced because when isobutylene, for example, is used as raw material, there is initially one double bond for four carbon atoms, whereas after polymerization of two molecules there is only one double bond for eight carbon atoms, then one double bond for twelve, and so on until in the highly polymerized product having a molecular weight of several thousand or more the degree of unsaturation is quite insignificant.

The various types of waxes with which these high molecular weight hydrocarbon polymers may be blended include paraffin wax, petrolatum, especially high melting point petroleum waxes such as obtained from Pendoepo and Talang Akar crudes, various natural mineral waxes such as montan wax, ozokerite, carnauba wax and various other types of waxes such as spermaceti wax, beeswax, and the like, besides various synthetic waxes such as those which have recently been produced by reacting high molecular weight organic acids, such as montanic acid, with iron, decomposing two molecules of the resultant iron salt to produce a ketone and hydrogenating a ketone to produce high molecular weight waxes of petroleum origin derived by special methods of treatment of wax-containing stocks. For instance, a high melting point wax may be prepared by distilling a petrolatum wax under conditions characteristic of superatmospheric distillation, diluting the distillate with a light petroleum distillate and filter pressing the diluted distillate under temperature conditions which give a sweatable cake of relatively low oil content and then sweating the filter cake.

Instead of using individual waxes for compounding with the high molecular weight hydrocarbon polymer, it is sometimes desirable to use a mixture of two or more types of wax, for instance, paraffin wax and carnauba wax, where the high melting point and hardness of the carnauba wax is used to improve the softness and relatively low melting point paraffin wax. Also 5 to 10% of the synthetic waxes mentioned above may be used to increase the hardness of a soft wax so that the blend will have a hardness equivalent to carnauba wax. If a larger amount, for example, 18 or 20% of the synthetic wax is used, a composition may be obtained having a hardness even surpassing that of carnauba wax.

In carrying out the present invention, the high molecular weight hydrocarbon polymers prepared as above described are blended in various proportions with a wax or mixture of waxes so that the blended composition will have the desired hardness, toughness, melting point and other physical properties, depending upon the use for which the composition is intended. For example, in making coating compositions suitable for coating or impregnating relatively rigid materials such as wood, stone, concrete, etc., the proportion of hydrocarbon polymer is preferably within the approximate limits of 0.1 to 5 or possibly to 20 or 30%, whereas for coating or impregnating flexible, porous or fibrous materials such as paper, cloth, etc. the percentage of hydrocarbon polymer should be somewhat higher, for example, between the approximate limits of 10 or 15 to 40 or 50% or more depending upon the molecular weight of the polymer, which may be 500 to 1000 or 2000 or even to 8000 or even as high as 20,000 the melting point and hardness of the wax or waxes used and the properties desired in the finished composition. For making molded products such as various types of electrical equipment including condensers, transformers, battery containers, candles, etc., the percentage of hydrocarbon polymer may vary over a wide range (practically any proportions) but should preferably be fairly high as for example from 30 or 40% up to 80 or 95% of the total mixture, although it is likewise desirable to maintain a high melting point in the finished composition so that for such compositions preferably high melting point waxes should be used and also hydrocarbon polymers having a relatively high molecular weight, for instance, 10,000 to 30,000 or even higher. Due to its non-carbonizing nature this type of polymer is very suitable for such uses. Various blends of hydrocarbon polymer and waxes may be used as plasticizing agent for compounding natural and synthetic rubber as well as rubber substitutes.

In preparing various types of products according to the invention, it may also be desirable to use two or more different types of wax-hydrocarbon polymer blends in the same product. For example, it has been found desirable for certain uses, first, to impregnate a paper or fabric with either the hydrocarbon polymer alone or wax compositions containing a relatively high percentage of such polymer and subsequently coat the thus impregnated paper or fabric with a composition having a higher melting point such as either pure wax or a wax composition containing a lesser percentage of hydrocarbon polymer than was used for the preliminary impregnation of said paper or fabric. Products of this nature have the advantage of high flexibility and yet can be stored in stacks containing a number of sheets of such product without having adjacent surfaces of the sheets gradually melt or fuse together under the pressure of the overlying layers. Such mixtures may also be employed as coating compositions, emulsions, leather dressings, shoe shine polishes, etc.

Various addition agents may also be added, as for instance polymerization inhibitors such as sulfur, oxidation inhibitors such as phenols and amines, dyes, pigments, plasticizing or hardening agents, resins, fillers, voltolized oils, flame coloring compounds, color stabilizers, and the like.

Example 1

Paraffin wax and isobutylene polymer having a molecular weight of about 10,000 to 15,000 were mixed in equal quantities with application of a slight amount of heat. The ingredients were found to be mutually soluble and when cooled, solidified to a homogeneous, almost colorless wax-like, plastic product.

Example 2

The product obtained in Example 1 was dissolved in naphtha in a concentration of about 10% and the solution was used for impregnating and waterproofing a piece of cloth.

Example 3

The product prepared in Example 1 was found to be of suitable consistency and to have desirable dielectric capacity for use in preparing electric equipment such as laminated foil, condensers, storage battery containers, etc.

Example 4

A sample of de-oiled petrolatum wax of 140° F. melting point was melted and 5% of isobutylene polymer of about 25,000 molecular weight was dissolved therein. This composition served as a very satisfactory impregnating agent for paper, giving the paper a clearer finish than that produced by wax alone.

Inasmuch as the above description and examples have been given merely for the sake of illustration and not for the purpose of limiting the invention thereto, it is intended to claim all inherent novelty in the invention as broadly as the prior art permits.

I claim:

1. A product comprising a base protected by having applied thereto a composition comprising essentially paraffin wax and a substantially saturated linear polymer of isobutylene having a molecular weight greater than about 1,000.

2. Product according to claim 1 in which the composition also contains a wax which is harder and has a higher melting point than paraffin wax.

3. A product comprising a flexible fibrous sheet material impregnated with a composition consisting essentially of a wax and about 10 to 50% of a substantially saturated plastic linear isobutylene polymer having a molecular weight greater than about 1,000.

4. A product comprising a paper base having a protective coating of a composition comprising essentially paraffin wax and a substantially saturated linear polymer of isobutylene having a molecular weight greater than 1,000.

5. A product comprising a fibrous sheet material base having a waterproof coating of a flexible composition comprising essentially paraffin wax and a substantially saturated plastic linear isobutylene polymer having a molecular weight greater than 1,000.

PETER J. WIEZEVICH.